United States Patent [19]
Brocheton

[11] Patent Number: 5,932,501
[45] Date of Patent: Aug. 3, 1999

[54] HIGH-INDEX GLASSES THAT ABSORB UV RADIATION

[75] Inventor: Yves A. H. Brocheton, Fontenay Sous Bois, France

[73] Assignee: Corning Incorporated, Corning, N.Y.

[21] Appl. No.: 09/011,166

[22] PCT Filed: Oct. 9, 1996

[86] PCT No.: PCT/US96/16192

§ 371 Date: Feb. 2, 1998

§ 102(e) Date: Feb. 2, 1998

[87] PCT Pub. No.: WO97/14661

PCT Pub. Date: Apr. 24, 1997

Related U.S. Application Data

[60] Provisional application No. 60/010,132, Jan. 17, 1996.

[30] Foreign Application Priority Data

Oct. 18, 1995 [FR] France ................................ 95 12230

[51] Int. Cl.⁶ .......................... C03C 3/068; C03C 3/095; C03C 4/08
[52] U.S. Cl. ................................ 501/64; 501/56; 501/58; 501/59; 501/65; 501/67; 501/78; 501/903; 501/905
[58] Field of Search ................................ 501/64, 65, 67, 501/78, 903, 905, 56, 58, 59

[56] References Cited

U.S. PATENT DOCUMENTS

| | | |
|---|---|---|
| 4,438,211 | 3/1984 | Mennemann et al. . |
| 4,642,297 | 2/1987 | Mennemann et al. . |
| 4,839,314 | 6/1989 | Boudot et al. . |
| 5,023,210 | 6/1991 | Krumwiede et al. . |
| 5,145,805 | 9/1992 | Tarumi et al. . |
| 5,281,562 | 1/1994 | Araujo et al. . |

*Primary Examiner*—Karl Group
*Attorney, Agent, or Firm*—Angela N. Nwaneri

[57] ABSTRACT

The invention relates to glasses which absorb UV radiation and which have the following composition, in wt. %: $SiO_2$ 30–52; ZnO 0–8; $B_2O_3$ 12–22; PbO 0–2; $ZrO_2$ 5–14; $Y_2O_3$ 0–15; $Al_2O_3$ 0–12; $La_2O_3$ 5–25; $Li_2O$ 1.5–3.5; $TiO_2$ 0–2; $Na_2O$ 0–6; $HfO_2$ 0–2; $K_2O$ 2–9; $Nb_2O_5$ 0–2; MgO 0–5; $Ta_2O_5$ 0–2; CaO 0–5; $MoO_3$ 0–2; SrO 0–9; $WO_3$ 0–2; BaO 0–14; SnO 0–4; $Sb_2O_3$ 0–4; $SnO_2$ 0–4; $As_2O_3$ 0–4; CdO 0–1; CuO 0.15–1; F 0–2; Cl 0–3; Br 0–3; I 0–2 with the following conditions: $Li_2O+Na_2O+K_2O$ ($X_2O$) 7–14; $MgO+CaO+SrO+BaO$ (XO) 12–20; $ZrO_2+Al_2O_3<15$; F+Cl+Br+I 0.2–4.0; $TiO_2+PbO+Nb_2O_5 \leq 2$; $As_2O_3+Sb_2O_3+SnO_2+SnO$ 0.05–4.0 and a ratio $R=(M_2O+2MO-Al_2O_3-ZrO_2)/B_2O_3$ where $M_2O$ and MO represent the total content of alkali metal oxide and the total content of alkaline-earth metal oxides, respectively, expressed in mol. %, between 0.50 and 1.00. Application to the manufacture of ophthalmic lenses, notably.

5 Claims, No Drawings

HIGH-INDEX GLASSES THAT ABSORB UV RADIATION

This application claims benefit of Provisional Application Ser. No. 60/010,132 filed Jan. 17, 1996.

The present invention relates to ophthalmic glasses with a refractive index of at least 1.58 which, in addition to having high transmittance in the visible range and a low intrinsic coloration, possess a strong, and even complete absorption in the ultraviolet spectrum, while being nonphotochromic.

For some years, great attention has been paid to the harmful effects of ultraviolet radiation (UV) on humans. Among the parts of the body that require an effective protection against the biological damages caused by solar radiation or UV radiation in general, the eye is often cited because of its relative fragility. This fragility is at the origin of the development of numerous colored glasses intended to filter solar radiation.

Moreover, it is well known that the effects of UV radiation are not limited to interaction with living matter, but can also result in the degradation of organic materials (paints, plastics, etc.) Similarly, the sun is not the only source capable of emitting UV radiation that can be at the origin of this degradation. There are several types of artificial sources, such as halogen or xenon lamps, which can emit a non-negligible amount of ultraviolet radiation.

Thus, it would be of certain interest to be able to have available a glass that is transparent in the visible range but offers good protection against ultraviolet radiation. Such glasses are of particular interest for lighting, bottling, protection against radiation, ophthalmic lens design, and other similar applications.

For ophthalmic applications, it is known that the photochromic glasses which include halide crystals, are activated by the absorption of UV radiation. This absorption clearly is reflected in a variation of the transmission of the visible spectrum by the glass, and a certain protection of the eyes offered because such glasses strongly absorb radiations with wavelengths of less than 320 nm and, less so, radiation between 320 and 400 nm. Although this radiation spectrum is less dangerous than that of the shorter wavelengths, it must be eliminated in some cases.

However, for other applications, no change in transmission must occur at the time of exposure to UV radiation or to the sun. Therefore, it is essential to be able to obtain a clear cutoff of UV radiation without the development of photochromism.

Moreover, the trend observed in the market of eyewear is the use of high-index materials. Indeed, surface-coated lenses with strong negative powers have thick edges if a conventional glass with an index of 1.523 is used. In comparison to the lenses elaborated in such glasses, the use of high-index glasses allows, for the same correction, an increase in the radius of curvature of the lens and consequently a reduction in the thickness.

Until now, glasses that combined the benefits of a high refractive index and a clear cutoff between ultraviolet radiation and the visible spectrum while remaining nonphotochromic and colorless were not known.

The object of the present invention is to provide essentially transparent nonphotochromic glasses, with a refractive index of at least 1.58, presenting an abrupt cutoff at approximately 400 nm with respect to ultraviolet radiation, characterized by the following composition, expressed in weight percentages based on oxides:

| | | | |
|---|---|---|---|
| $SiO_2$ | 30–52 | ZnO | 0–8 |
| $B_2O_3$ | 12–22 | PbO | 0–2 |
| $ZrO_2$ | 5–14 | $Y_2O_3$ | 0–15 |
| $Al_2O_3$ | 0–12 | $La_2O_3$ | 5–25 |
| $Li_2O$ | 1.5–3.5 | $TiO_2$ | 0–2 |
| $Na_2O$ | 0–6 | $HfO_2$ | 0–2 |
| $K_2O$ | 2–9 | $Nb_2O_5$ | 0–2 |
| MgO | 0–5 | $Ta_2O_5$ | 0–2 |
| CaO | 0–5 | $MoO_3$ | 0–2 |
| SrO | 0–9 | $WO_3$ | 0–2 |
| BaO | 0–14 | SnO | 0–4 |
| $Sb_2O_3$ | 0–4 | $SnO_2$ | 0–4 |
| $As_2O_3$ | 0–4 | CdO | 0–1 |
| CuO | 0.15–1 | F | 0–2 |
| Cl | 0–3 | Br | 0–3 |
| I | 0–2 | | | with the following conditions:

| | |
|---|---|
| $Li_2O + Na_2O + K_2O$ ($X_2O$) | 7–14 |
| MgO + CaO + SrO + BaO (XO) | 12–20 |
| $ZrO_2 + Al_2O_3$ | <15 |
| F + Cl + Br + I | 0.2–4.0 |
| $TiO_2 + PbO + Nb_2O_5$ | ≦2 | and a ratio $R=(M_2O+2MO-Al_2O_3-ZrO_2)/B_2O_3$ where $M_2O$ and MO represent the total content of alkali metal oxide and the total content of alkaline-earth metal oxides, respectively, expressed in mol %, between 0.50 and 1.00.

The ratio R is connected with the alkalinity of the glass. In general, the value of the ratio R which allows the best precipitation of the crystals is approximately 0.60–0.90, particularly approximately 0.70. The lowest values of the indicated range for R are given by the combination of high contents of $ZrO_2$ and $Al_2O_3$, which makes the glass difficult to melt, without any particular benefit being drawn from the combination. At the other extreme, the highest values of the ratio R are obtained for glasses whose contents of alkali and/or alkaline-earth metal oxides are large. Under these conditions, the precipitation of copper colloids is favored, and a strict control must be applied regarding the elements required for the constitution of the crystals (copper and halogens), as well as a lowering of the quantity of reducing agents necessary for the reduction of copper.

In the case of precipitation of colloids, the resulting glass can take on different colors (green-blue, red, brown, orange, etc.,) depending on the oxidation state of copper and the quantity of reducing agents which they contain. An adjustment of its transmission in the visible range and of its final coloration is then possible by the addition of small quantities of colouring agents such as ions of transition metals or of rare earths, without any detectable damage insofar as the performances regarding the properties of absorption of the ultraviolet cutoff are concerned. Thus, although the obtention of colorless glasses is the primary objective of the invention, colored glasses are also contemplated. Under certain conditions colored glasses can be produced by the use of relatively high contents (for example, 3–4%) of reducing agents, such as SnO, or by the incorporation of conventional colouring agents in the composition of the glass. Such colored glasses can be useful notably for the manufacture of lenses for sunglasses.

The presence of at least one halogen is necessary so it can combine with copper and form copper halide crystals, which are responsible for the UV cutoff. Chlorine and bromine are the halogens that are most routinely used. Fluorine and iodine can be beneficial, but in general they are not used in the absence of chlorine and bromine.

The use of cadmium oxide is not required to obtain UV absorption. The advantages that can be drawn from the absorption it contributes in addition to that of copper are small compared to its high toxicity. Moreover, in some cases, photochromism may be promoted, a phenomenon which is not desired in the present invention. It is also preferred that the content be less than 1% and preferably zero.

To increase the refractive index, large quantities of one or more oxides such as $TiO_2$, $Nb_2O_5$, $ZrO_2$, $ZnO$, $PbO$, with optional additions of alkaline-earth metal oxides, are generally used. The inclusion of $TiO_2$, or of $Nb_2O_5$ offers the advantage of quickly increasing the refractive index without any significant change to the density of the glass. Thus, the glasses which are currently sold, and which have a refractive index of approximately 1.6, contain large quantities of such oxides. Unfortunately, the use of $TiO_2$, $PbO$ or $Nb_2O_5$ in the presence of copper required for the obtention of the ultraviolet cutoff at approximately 400 nm leads to a strong yellow coloration of the glasses. This coloration, which can be used to advantage in the elaboration of glasses for solar protection, is not acceptable for the inventive glass. Thus, the glasses of the invention are preferably essentially free of $TiO_2$, $PbO$ and $Nb_2O_5$ although very small quantities of these compounds can be tolerated, that is, less than 2% in total.

Also, to obtain a high refractive index, it is preferred to use oxides such as $ZrO_2$, $Al_2O_3$, $La_2O_3$, $Y_2O_3$, $ZnO$ and alkaline-earth metal oxides, whereas the total content of other heavy metal oxides such as $MoO_3$, $WO_3$, $PbO$, $TiO_2$ and $Nb_2O_5$ should preferably be kept below 4%, particularly below 2%. Naturally, for applications where the coloration is less important, for example, for colored solar protection glasses, this total content can be considerably higher.

The limitation of the use of heavy metal oxides includes such undesirable outcomes as increase in density, and for $MoO_3$ and $WO_3$, the fact that they favor the appearance of photochromism which is not desirable for the present application.

The preferred compositions of the glass are as follows, in wt %:

| | | | |
|---|---|---|---|
| $SiO_2$ | 35–47 | CaO | 0–3 |
| $B_2O_3$ | 12–19 | SrO | 0–7 |
| $ZrO_2$ | 6.5–12 | BaO | 2–7 |
| $Al_2O_3$ | 0–6 | ZnO | 0–3 |
| $Li_2O$ | 1.5–3 | $Y_2O_3$ | 0–12 |
| $Na_2O$ | 2–5 | $La_2O_3$ | 8–20 |
| $K_2O$ | 2–7 | SnO | 0.2–2.5 |
| CuO | 0.25–0.75 | Br | 0.1–2 |
| Cl | 0.1–2 | | |

The glasses according to the invention have the following properties:
 a refractive index between 1.58 and 1.65;
 an Abbe number between 40 and 60;
 a density of less than 3.5 g/cm³;
 an optical transmittance in the visible range of more than 85%;
 a total absorption of UV radiation, defined by a mean transmittance between the wavelengths of 315 and 380 nm of less than 0.5%;
 no photochromism.

U.S. Pat. No. 5,023,209 (Grateau et al.) is representative of commercial glasses with a refractive index of approximately 1.6. This patent proposes base glass compositions that contain large quantities of $TiO_2$ and lead to the development of a pronounced photochromism after thermal treatment.

French Patent No. A 2,717,915 describes photochromic glasses with high refractive index having a low original coloration. This improvement is obtained due to the use of quantities of less than 2% $TiO_2$ and more than 6% $Nb_2O_5$. The compositions of the present invention, however, differ from these glasses in the absence of silver and in their considerably lower $Nb_2O_5$ contents.

U.S. Pat. No. 5,145,805 (Tarumi et al.) covers two families of glasses containing up to 15% copper chloride. The family that does not include phosphate comprises the percentages by weight of the following constituents: $SiO_2$ 20–85%, $B_2O_3$ 2–75%, 15% $Al_2O_3$ or less, approximately 30% or less of at least one alkali metal oxide, 10% or less of at least one divalent metal oxide, approximately 10% of at least one of the following oxides $ZrO_2$, $La_2O_3$, $Y_2O_3$, $Ta_2O_3$, $Gd_2O_3$. No range of refractive indices is claimed and, in the examples, the concentrations of oxides such as $ZrO_2$, $La_2O_3$ and $Y_2O_3$ are less than 1%. Consequently, although there is an overlap between the broad intervals of Tarurni and the composition intervals of the present invention, none of the work examples provided in this patent has a base composition within the intervals of the glasses of the present invention.

U.S. Pat. No. 5,281,562 (Araujo et al.) describes compositions of nonphotochromic transparent borosilicate glasses containing a crystalline phase of copper chloride and copper/cadmium and having an abrupt UV cutoff at approximately 400 nm. The authors claim a composition range connected with a ratio R expressed in mol % of between 0.15 and 0.45 with an optimum at a value of approximately 0.25. Thus, the quantity of alkaline and alkaline-earth metal oxides must be controlled strictly to attain this condition. They also mention that the oxides which are generally used to increase the refractive index, such as those of titanium, zirconium, niobium, or lead, must be used in small quantities. Consequently, the compositions described in the patent have a refractive index in the range close to the standard value (1.523). The present invention describes compositions of glasses with a much higher refractive index, for which the ratio R expressed in mol % is outside of the claimed domain.

European Patent No. A 0,586,948 (Sugimoto et al.) describes aluminoborosilicate glasses that absorb ultraviolet radiation. The use of heavy oxides such as $La_2O_3$ and $Y_2O_3$ is not mentioned, and no value of the refractive index is given.

Table I recapitulates the glass compositions, expressed in parts per weight based on the oxides, illustrating the products of the invention. Given that the sum of the individual components is equal to 100 or close to 100, the values mentioned in the table can be considered for all practical purposes as representing weight percentages. In addition, given that the cation(s) with which the halogens are combined are not known, and given that the proportions of the latter halogens are low, Cl, Br, I and F are expressed in elemental form. The values indicated to Cl, Br, I and F are the batched quantities. Experience has shown that the percentage which in fact remains in the vitreous matrix is clearly lower and that the rate of retention for the halogens typically is approximately 50–75%.

The ingredients of the starting batch can consist of any materials, whether oxides or other compounds, which, when melted together, are converted into the desired oxides in the wanted proportions. Cl, Br, I and F in general are incorporated in the batch in the form of alkali or alkaline-earth metal halides.

The ingredients of the batch are combined, thoroughly mixed together to promote the obtention of a homogeneous melt, and placed into a platinum crucible heated by Joule effect to a temperature between 1250° C. and 1300° C., depending on the composition of the batch. When the batch has reached complete fusion, the temperature of the melt is raised to approximately 1350–1450° C. to ensure a good homogeneity and a good refining. The melt is then cooled and simultaneously shaped into a glass article with the desired geometry, which is immediately transferred into an annealing oven, which operates at approximately 450° C.

It should be noted that the above description reflects only melting and forming procedures done in the laboratory, and that the glasses of the invention can be melted in large-scale melting units and formed into articles having desired geometries using techniques which are conventional in the glass technology. Thus, according to the usual methods for melting and forming glass, it is only necessary to mix the materials thoroughly, to melt the batch at sufficiently high temperatures and for sufficiently long durations to obtain a homogeneous melt, to cool the melt and form it simultaneously into a glass body having a desired geometry, and, normally, to anneal this glass body.

Samples have been cut out of annealed glass articles. These samples were introduced into an electrical heating furnace and exposed for durations, expressed in minutes, and temperatures, expressed in ° C., indicated in Table II so as to develop in the furnace the crystalline phase of copper halides responsible for the absorption in the range of ultraviolet radiation.

To obtain this precipitation, the glass must contain at least 0.15% copper oxide, CuO. This quantity can be raised up to approximately 1%; however, when this is done, the cupric and/or cuprous ions have a tendency to become reduced to a neutral form. Thus, the use of approximately 0.25–0.75% CuO is preferred.

The absorption of the red part of the spectrum, resulting in the development of a green-blue coloration, is connected with the "d" transition of the cupric ions ($Cu^{2+}$). These "d" orbitals are completely occupied if copper is in the cuprous form ($Cu^-$). Thus, these ions do not contribute to giving the glass a visible coloration. Because only this form of copper is necessary to obtain the UV cutoff, a colorless glass is obtained by adjusting the oxidation state of copper in an appropriate manner.

The oxidation state of copper obtained in the glass is influenced by several parameters, the principal ones being the alkalinity of the glass, estimated by the ratio R, and the concentrations of reducing agents such as $As_2O_3$, $Sb_2O_3$, $SnO_2$ and $SnO$. These polyvalent ions are very powerful in displacing the equilibrium between cupric and cuprous ions and, consequently, they have an important effect on the color of the glass. At least one reducing agent must be present in an amount up to 4% by weight based on the oxides, preferably, in the range of 0.05 to 3%, more preferably in the range of 0.2–2.5%. Furthermore, because $As_2O_3$, $Sb_2O_3$, $SnO_2$ and $SnO$ have cumulative or concurrent effects as reducing agents, their sum should not exceed 4.0% by weight. Among the reducing agents cited, stannous oxide, SnO, is preferred because of its high reducing power. Its concentration must, however, be carefully controlled to avoid the reduction of copper to the metallic form, $Cu^0$, which is responsible for the development of a strong red coloration of the glass. High concentrations of reducing agents, up to 4%, can be used without any observation of precipitations of colloidal copper.

Table II indicates for each example of glass given:

the value of the ratio R defined above;

the temperature, in ° C., and the time, in minutes, used to develop the crystalline phase responsible for UV absorption;

the refractive index (R.I.);

the Abbe number (Abbe);

the density in $g/cm^3$ measured by the immersion method;

the transmission factor in the visible domain (T) measured on samples with a thickness of 2 mm;

the color is defined by the trichromatic coordinates (x and y);

the ultraviolet cutoff(UV cutoff) defined as the wavelengths, in nanometers (nm) at which the transmission is equal to 1%;

the average transmittance in percent in the ultraviolet range, defined as the average of the transmittances measured every 5 nm between 315 and 380 nm.

Example 1 is representative of a transparent glass having an index equal to approximately 1.6, in which no element necessary for the development of a crystalline phase that absorbs ultraviolet radiation has been introduced. This glass, which can be considered as an illustration of the optical performances of commercially available high-index glasses, provides no protection against ultraviolet radiation. In particular, the ultraviolet cutoff of such glasses occurs only at approximately 315 nm, which results in an average transmittance in the UV range on the order of 45%.

Examples 2 to 6 show the perfect protection against UV radiation obtained due to the precipitation of copper halides in glasses whose refractive index is approximately 1.6, and thus having an R ratio of more than 0.5.

Example 2 establishes a comparison between the performances of the glasses of the invention and of standard glasses represented in Example 1. The glasses of the present invention present, for equivalent factors of transmittance in the visible range and without serious drawbacks with regard to color, a complete absorption of ultraviolet radiation. The latter is reflected by a UV cutoff at a wavelength that is clearly higher than 380 nm, the upper limit of UV radiation. These optical properties are reached with a base composition that is identical to the one used in Example 1, to which halides, copper and a reducing agent such as SnO were added.

Example 3 is representative of the use of high contents of lanthanum oxide to obtain the desired properties.

Example 4 is representative of the use of high contents of lanthanum and yttrium oxide, which presents the advantage of lowering the density of the glass obtained.

Examples 5 and 6 illustrate the possibility of introducing additional quantities of alkali and alkaline-earth oxides without reducing the optical performances of the product. In these examples, the ratio R is increased to 0.80, and the UV absorption remains excellent. Example 6 shows the influence of the heat treatment on the absorption properties. This example illustrates the possibilities of adaptation of the final performances of the product by means of an appropriate heat treatment.

Examples 7 to 9 are compositions which, for one reason or another, do not fall within the preferred scope of the patent.

Example 7 is representative of compositions using high contents of alkaline-earth metal oxides without particular precautions being taken with regard to the adjustment of either the ratio R or the constituent elements of the crystalline phase, that is, copper, halogens and/or reducing agents. As a result, the barium oxide content is outside of the claimed limits, and the ratio R is at the upper limit. This example illustrates the phenomenon of precipitation which is observed in certain cases. In spite of an appreciable decrease in its transmittance factors and the loss of transparency, the glass preserves its radiation absorption properties. Such a glass, without falling within the preferred context of the claims, can be used in applications where the transparency properties are less important, such as solar protection glasses, for example.

Example 8 shows a glass in which the zinc oxide content is outside of the claimed range. In this case, the glass remains transparent but, in contrast, it loses its ultraviolet radiation absorption properties.

Example 9 shows a glass in which the niobium oxide content is greater than the claimed limit value. The glass described takes on a yellowish coloration, without any observable special advantage with regard to UV absorption.

TABLE I

|  | 1 | 2 | 3 | 4 | 5 | 6 | 7 | 8 | 9 |
|---|---|---|---|---|---|---|---|---|---|
| $SiO_2$ | 45.2 | 45.2 | 38.6 | 37.3 | 48.8 | 43.8 | 38.8 | 36.2 | 46.1 |
| $B_2O_3$ | 14.3 | 14.3 | 13.4 | 13.6 | 15.4 | 15.4 | 13.4 | 13.9 | 14.5 |
| $ZrO_2$ | 11.3 | 11.3 | 10.6 | 10.7 | 12.2 | 12.2 | 10.6 | 11.0 | 11.5 |
| $Li_2O$ | 1.9 | 1.9 | 1.8 | 1.8 | 2.8 | 2.8 | 1.8 | 1.8 | 1.9 |
| $Na_2O$ | 2.6 | 2.6 | 2.4 | 2.5 | 2.8 | 2.8 | 2.4 | 2.5 | 1.1 |
| $K_2O$ | 2.7 | 2.7 | 2.6 | 2.6 | 3.0 | 3.0 | 2.6 | 2.7 | 5.2 |
| SrO | 1.7 | 1.7 | 1.6 | 1.6 | 1.9 | 1.9 | 1.6 | 1.7 | 1.8 |
| BaO | 5.4 | 5.4 | 5.0 | 5.1 | 5.8 | 5.8 | 14.7 | 5.2 | 5.5 |
| ZnO | — | — | — | — | — | — | — | 10.5 | — |
| $Nb_2O_5$ | — | — | — | — | — | — | — | — | 12.4 |
| $La_2O_3$ | 14.9 | 14.9 | 24.1 | 14.2 | 7.3 | 7.3 | 14.0 | 14.5 | — |
| $Y_2O_3$ | — | — | — | 10.7 | — | — | — | — | — |
| CuO | — | 0.5 | 0.5 | 0.5 | 0.5 | 0.5 | 0.5 | 0.5 | 0.5 |
| Cl | — | 1 | 1 | 1 | 1 | 1 | 1 | 1 | 0 |
| Br | — | 2 | 2 | 2 | 2 | 2 | 2 | 2 | 1 |
| SnO | — | 2 | 2 | 2 | 2 | 2 | 2 | 2 | 1 |

TABLE II

|  | 1 | 2 | 3 | 4 | 5 | 6 | 7 | 8 | 9 |
|---|---|---|---|---|---|---|---|---|---|
| Ratio R | 0.68 | 0.68 | 0.68 | 0.68 | 0.8 | 0.8 | 1.01 | 0.68 | 0.68 |
| *Heat Treatment* | | | | | | | | | |
| Temp. | 680 | 680 | 680 | 680 | 680 | 600 | 680 | 680 | 680 |
| Time | 15 | 15 | 15 | 15 | 15 | 15 | 15 | 15 | 15 |
| *Physical Properties* | | | | | | | | | |
| Refrac. Index | 1.598 | 1.598 | 1.632 | 1.634 | 1.582 | 1.582 | 1.624 | 1.626 | 1.600 |
| Abbe No. | 52.5 | 52.5 | 52.1 | 51.2 | 54.9 | 54.9 | 52.5 | 51.3 | 45.2 |
| Density | 3.01 | 3.01 | 3.28 | 3.25 | 2.85 | 2.85 | 3.26 | 3.24 | 2.81 |
| *Optical Properties* | | | | | | | | | |
| T | 89.4 | 89.6 | 88.7 | 88.8 | 88.2 | 89.6 | 51.1 | 88.1 | 85.6 |
| x | 0.3118 | 0.3133 | 0.3126 | 0.3120 | 0.3172 | 0.3112 | 0.3660 | 0.3111 | 0.3265 |
| y | 0.3188 | 0.3228 | 0.3214 | 0.3202 | 0.3293 | 0.3184 | 0.3341 | 0.3175 | 0.3392 |
| Appearance | Colorless | Colorless | Colorless | Colorless | Colorless | Colorless | Red | Colorless | Yellow |
| UV Cutoff nm | 315 | 404 | 408 | 405 | 413 | 389 | 412 | 320 | 344 |
| *Average Transmission in UV Spectrum* | | | | | | | | | |
| Between 315 and 380 nm | 46.8 | 0 | 0 | 0 | 0 | 0 | 0 | 38.9 | 6.5 |

I claim:

1. Essentially transparent nonphotochromic glasses with a refractive index of at least 1.58, presenting an abrupt cutoff at approximately 400 nm with respect to ultraviolet radiation, characterized by the following composition, expressed in weight percentages based on the oxides:

| | | | |
|---|---|---|---|
| $SiO_2$ | 30–52 | ZnO | 0–8 |
| $B_2O_3$ | 12–22 | PbO | 0–2 |
| $ZrO_2$ | 5–14 | $Y_2O_3$ | 0–15 |
| $Al_2O_3$ | 0–12 | $La_2O_3$ | 5–25 |
| $Li_2O$ | 1.5–3.5 | $TiO_2$ | 0–2 |
| $Na_2O$ | 0–6 | $HfO_2$ | 0–2 |
| $K_2O$ | 2–9 | $Nb_2O_5$ | 0–2 |
| MgO | 0–5 | $Ta_2O_5$ | 0–2 |
| CaO | 0–5 | $MoO_3$ | 0–2 |
| SrO | 0–9 | $WO_3$ | 0–2 |
| BaO | 0–14 | SnO | 0–4 |
| $Sb_2O_3$ | 0–4 | $SnO_2$ | 0–4 |
| $As_2O_3$ | 0–4 | CdO | 0–1 |
| CuO | 0.15–1 | F | 0–2 |
| Cl | 0–3 | Br | 0–3 |
| I | 0–2 | | | with the following conditions:

| | |
|---|---|
| $Li_2O + Na_2O + K_2O\ (X_2O)$ | 7–14 |
| $MgO + CaO + SrO + BaO\ (XO)$ | 12–20 |
| $ZrO_2 + Al_2O_3$ | <15 |
| $F + Cl + Br + I$ | 0.2–4.0 |
| $TiO_2 + PbO + Nb_2O_5$ | ≤2 |
| $As_2O_3 + Sb_2O_3 + SnO_2 + SnO$ | 0.05–4.0 | and a ratio $R=(M_2O+2MO-Al_2O_3-ZrO_2)/B_2O_3$ where $M_2O$ and MO represent the total content of alkali metal oxide and the total content of alkaline-earth metal oxides, respectively, expressed in mol %, between 0.50 and 1.00.

2. Glasses according to claim 1, characterized in that they are essentially free of CdO.

3. Glasses according to claim 1 or 2, characterized in that they have the following composition:

| | | | |
|---|---|---|---|
| $SiO_2$ | 35–47 | CaO | 0–3 |
| $B_2O_3$ | 12–19 | SrO | 0–7 |
| $ZrO_2$ | 6.5–12 | BaO | 2–7 |
| $Al_2O_3$ | 0–6 | ZnO | 0–3 |
| $Li_2O$ | 1.5–3 | $Y_2O_3$ | 0–12 |
| $Na_2O$ | 2–5 | $La_2O_3$ | 8–20 |
| $K_2O$ | 2–7 | SnO | 0.2–2.5 |
| CuO | 0.25–0.75 | Br | 0.1–2 |
| Cl | 0.1–2 | | |

4. Glasses according to claim 1, characterized in that they are coloured by the addition of colouring agents and/or by a precipitate of copper colloids.

5. Lens characterized in that it consists of a glass as defined in any one of claims 1 to 4.

* * * * *